United States Patent [19]
Dziark et al.

[11] Patent Number: 5,616,647
[45] Date of Patent: Apr. 1, 1997

[54] ONE PART ROOM TEMPERATURE VULCANIZING COMPOSITION HAVING BOTH A HIGH RATE OF EXTRUSION AND LOW SAG

[75] Inventors: John J. Dziark, Ballston Spa; Michael R. Pink, Schulyerville; John P. Martucci, Ballston Lake, all of N.Y.

[73] Assignee: General Electric Company, Waterford, N.Y.

[21] Appl. No.: 589,521

[22] Filed: Jan. 22, 1996

Related U.S. Application Data

[63] Continuation of Ser. No. 270,095, Jul. 1, 1994, abandoned, which is a continuation-in-part of Ser. No. 96,315, Jul. 23, 1993, abandoned, which is a continuation-in-part of Ser. No. 981,571, Nov. 25, 1992, abandoned.

[51] Int. Cl.$^6$ .............................. C08K 3/26; C08L 83/06
[52] U.S. Cl. ............................................ 524/788; 524/864
[58] Field of Search ....................................... 524/864, 788

[56] References Cited

U.S. PATENT DOCUMENTS

| | | |
|---|---|---|
| 2,938,009 | 5/1960 | Lucas . |
| 3,635,743 | 1/1972 | Smith . |
| 4,514,529 | 4/1985 | Beers et al. ............................ 523/200 |
| 4,528,324 | 7/1985 | Chung et al. ........................... 524/863 |

FOREIGN PATENT DOCUMENTS

| | | |
|---|---|---|
| WO-A-9319130 | 9/1993 | WIPO . |

OTHER PUBLICATIONS

MIL-A-46106B Sep. 18, 1970 Military Specification Adhesive-Sealants, Silicone, RVT, One-Component.

*Primary Examiner*—Ralph H. Dean
*Attorney, Agent, or Firm*—Kenneth S. Wheelock

[57] ABSTRACT

A method for producing a room temperature vulcanizable composition that has a high rate of extrusion and a low sag wherein a base mixture of a diorganopolysiloxane and an end stopping cross linking ketoximosilane are reacted prior to being added to a first injection port along an extruder, an inorganic filler being added to said base mixture at a second injection port along the extruder, an M stopped silicone fluid being partitioned into two parts and the first part of said M stopped fluid being added to the filler containing base mixture at a third injection port at the middle of the extruder, and a tin catalyst, an adhesion promoter and the second part of the M stopped fluid being added at a fourth injection port along the extruder said mixture comprising these components being extruded towards the extruder exit port.

14 Claims, No Drawings

ONE PART ROOM TEMPERATURE VULCANIZING COMPOSITION HAVING BOTH A HIGH RATE OF EXTRUSION AND LOW SAG

CROSS-REFERENCE TO RELATED APPLICATIONS

This is a continuation of Ser. No. 08/270,095 filed on Jul. 1, 1994, abandoned, which is a continuation of 08/096,315 filed on Jul. 23, 1993, now abandoned, which is a continuation-in-part of Ser. No. 07/981,571 filed on Nov. 25, 1992, abandoned.

FIELD OF THE INVENTION

The field of the present invention relates to one part room temperature vulcanizable silicone rubber sealants that have improved application rates while maintaining a good resistance to vertical flow.

BACKGROUND OF THE INVENTION

The instant invention relates to a one-part room temperature vulcanizing (RTV) silicone rubber compositions which can be extruded at a high application rate and also exhibits a resistance to flow vertically when applied to a vertical surface. More particularly this invention relates to ketoxime RTV rubber compositions capable of high rates of extrusion while maintaining good resistance to vertical flow.

RTV rubber compositions are known in the art. Such compositions are known for their ability to resist change at elevated temperatures and exposure to adverse conditions over extended periods of time. In general, materials are needed which have outstanding properties such as good tensile strength and the ability to retain those outstanding properties when challenged by exposure to chemical agents known to reduce or diminish performance.

Successful efforts have been made to produce RTV elastomer, compositions having increased strength and adhesion. For example ketoxime sealants as set forth in U.S. patent application Ser. No. 07/857,202, filed Mar. 25, 1992, pending, entitled "One Part Room Temperature Vulcanizing Compositions with Improved Oil Resistance and Adhesion, assigned to General Electric Company, incorporated herein by reference, exhibit such desirable properties. When such ketoxime sealants are compounded continuously, the cross linker, adhesion promoter (when used), and catalyst are commonly added to an extruder as a single solution in a one step catalyzation. The resulting composition has good physical properties but is difficult to apply at high rates.

Successful efforts have been made to produce RTV elastomer compositions having increased strength and adhesion. For example, ketoxime sealants as set forth in U.S. patent application Ser. No. 07/981,571, filed Nov. 25, 1992, now abandoned entitled "One Part Room Temperature Vulcanizing Composition Having a High Rate of Extrusion," assigned to General Electric Company, incorporated herein by reference exhibit such desirable properties. When such ketoxime sealants are compounded continuously the catalyzation is divided wherein the cross linking agent and an optional adhesion promoter are added to an extruder followed by the addition of the tin containing catalyst further down the extruder. This two step catalyzation results in sealants that possess both good physical properties and the ability to be applied at a high rate of application, however the ability of the sealant composition to resist gravity induced flow when applied to a vertical surface could be improved. It is therefor very desirable to provide RTV compositions having not only good tensile strength, fast cure rates, and good room temperature adhesion but which may also be applied at a high rate of application and when applied to a vertical surface exhibit a low rate of gravity induced flow from the point of application.

SUMMARY OF THE INVENTION

The instant invention is based upon the discovery that adding the ketoxime cross linking agent to the diorganopolysiloxane polymer prior to the addition of the other components of the RTV composition preserves the benefit of being able to apply the sealant at high application rates. By comparison to the prior art, the instant invention further imparts the additional benefit of an increased resistance to vertical flow or sag when the sealant is applied to a vertical surface.

Specifically, reaction of a silanol polymer with a ketoxime cross-linking agent prior to its introduction into an extruder and prior to addition of the other RTV components results in the preparation of a sealant possessing both a high application rate and a desirable thixotropy, said sealant being more resistant to flow when applied to a vertical surface.

In a particular embodiment, methyltris(methylethylketoximo)silane, a cross linking agent, and a diorganopolysiloxane polymer was added to a reaction section preceding an extruder. The reaction section consists of a static mixer attached to an extruder. An inorganic filler was added in the first section of the extruder, about 70% of an M-stopped silicone fluid was added at approximately the middle of the extruder, and a solution containing the remaining 30% of the M-stopped fluid, a dibutyltin dilaurate catalyst, and an optional adhesion promoter gamma-aminopropyltriethoxysilane was added toward the end of the extruder.

DETAILED DESCRIPTION OF THE INVENTION

The present invention is directed to a method for producing a room temperature vulcanizing silicone rubber composition having a high rate of extrusion comprising the first step of adding a base composition (A) to a static reactor which feeds the base composition to an extruder at a first supply port along the extruder separated from an exit port thereof. The base composition, (A), comprises: (A 1 ) 100 parts by weight of a diorganopolysiloxane polymer having a viscosity ranging from about 600 to 300,000 cps at 25° C.; (A4) from about 2 to 15 parts by weight based upon the sum of (A1) and subsequent components (A2) and (A3) of a cross-linking agent such as (a) methyltris(methylethylketoximo)silane or (b) vinyltris(methylethylketoximo)silane, or mixtures of (a) and (b). After a period of time ranging from about 2 minutes to about 60 minutes the base composition is added to the first supply port of the extruder. At a second injection port, subsequent to the first injection port, (A2) from about 3 to about 25 parts by weight based upon (A1) of a silica filler; (A3) up to about 200 parts by weight based upon (A1) of a calcium carbonate filler. At a third injection port approximately in the middle of the length of the extruder and subsequent to the first two injection ports, (B1) up to about 56 parts by weight based upon (A1) of an M-stopped fluid having a viscosity ranging from about 50 to about 10,000 cps at 25° C. At a fourth injection port, subsequent to the first three but prior to the exit port of the extruder, (B1) up to about 24 parts by weight based upon (A1) of an M-stopped fluid having a viscosity ranging from about 50 to about 10,000 cps at 25° C.; (B2) up to about 0.5 parts by weight based upon the sum of (A1), (A2), and (A3) of a tin based catalyst such as dibutyltin dilaurate; and (A4) up to about 4 parts by weight based upon the sum of (A1), (A2), and (A3) of gamma-aminopropyltriethoxysilane (GAP) adhesion promoter. The room temperature vulcanizing compositions of the present invention have a high rate of application and exhibit good thixotropy.

In accordance with one embodiment of the present invention, (A1) is a silanol terminated diorganopolysilxane having a viscosity ranging from about 60 to 300,000, preferably from about 2,000 to 200,000 and more preferably from about 3,000 to about 150,000 cps at 25° C. (A 1) preferably has the formula:

where each R is independently selected from monovalent hydrocarbon radicals, free of aliphatic unsaturation and containing from 1 to about 10 carbon atoms, and x varies so that (A1) has a viscosity ranging from about 600 to about 300,000 cps at 25° C. In the examples that follow, x has been selected such that (A1) has a viscosity of 30,000 cps at 25° C. It is known in the art by those having ordinary skill in the art that molecular weight and viscosity are directly related in the polymeric siloxanes. Thus choosing higher values of x would lead to higher viscosities.

(A2) comprises from about 3 to about 25, preferably from about 3 to about 20 and more preferably from about 5 to 15 parts by weight based upon (A1) of a reinforcing filler such as fumed silica, $SiC_2$. The filler preferably has a surface area of between 100 and 300 $m^2/g$, more preferably the filler has a surface area of about 200 $m^2/g$, in the untreated state. The filler may be treated with various agents so as to prevent the composition from structuring, for example, cyclopolysiloxanes as disclosed in U.S. Pat. No. 2,938,009 to Lucas and silazanes as disclosed in U.S. Pat. No. 3,635,743 to Smith, or both. The cyclopolysiloxanes may be, for example, octamethylcyclotetrasiloxane ("D4") present in an amount of about 15 to 20 weight percent of the filler. In the examples below, (A2) is a chlorosilane treated fumed silica available commercially from DeGussa Corporation of Plainfield, N.J.

(A3) is a finely divided calcium carbonate, $CaCO_3$, filler that may be present in an amount up to about 200 parts by weight based upon (A1). In the examples below the calcium carbonate filler has been omitted from the formulation.

(A4) is a cross-linking agent that may comprise alkyl- or alkenyl- or vinyl-tris(dialkyl- or dialkenyl- or alkylalkenylketoximo)silane. In particular, (A4) may be selected from the group consisting of alkyl-tris(dialkyl-ketoximo)silane, alkyl-tris(dialkenyl-ketoximo)silane, alkyl-tris(alkylalkenyl-ketoximo)silane, alkenyl-tris(dialkyl-ketoximo)silane, alkenyl-tris(dialkenyl-ketoximo)silane, alkenyl-tris(alkylalkenylketoximo)silane, vinyl-tris(dialkyl-ketoximo)silane, vinyl-tris(dialkenyl-ketoximo)silane, and vinyl-tris(alkylalkenyl-ketoximo)silane. Preferably (A4) comprises (a) methyltris(methylethylketoximo)silane or (b) vinyltris(methylethylketoximo)silane or mixtures of (a) and (b). The cross-linking agent is present in an amount from about 2 to about 15 parts by weight based upon 100 parts of the sum of (A1), (A2), and (A3), preferably from about 2 to about 10 parts by weight based upon such sum, and more preferably from about 3 to about 7 parts by weight based upon such sum.

(A5) is gamma-aminopropyltriethoxysilane present in an amount up to about 4 parts by weight based upon 100 parts of the base composition (A). Preferably, the gamma-aminopropyltriethoxysilane is present in an amount from about 0.2 to about 2 parts by weight based upon (A) and more preferably from about 0.3 to about 1.5 parts by weight based upon (A).

(B1) is a processing aid or plasticizer in the form of an M-stopped fluid. In particular, (B1) is a triethylsilyl stopped siloxane having a viscosity ranging from about 50 to about 10,000, preferably 50 to about 3,000, and more preferably 50 to 1,000 cps at 25° C. In the examples below, the M-stopped fluid is a polymer having the form:

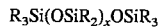

where each R is methyl and x is selected so that the viscosity is about 100 cps at 25° C. In the present invention, (B1) may be present in an amount up to 80 parts by weight, based upon (A1), preferably up to about 60 parts by weight based upon (A1), and more preferably up to about 40 parts by weight based upon (A1). (B1) is optionally partitioned between the last two injection ports of the extruder.

(B2) is a tin based catalyst that may be present in an amount of up to 0.50 parts by weight based upon 100 parts of the base composition (A). Preferably the catalyst is present in an amount from about 0.01 to about 0.4 parts by weight based upon (A), and more preferably from about )0.05 to about 0.30 parts based upon (A). The tin based catalyst is added in an amount such that there is between 19 and 760 ppm tin in the resultant sealant composition, and more preferably from 95 to about 570 ppm tin. Dibutyltin dilaurate is one of the tin catalysts that is preferred.

EXAMPLES

The following examples are designed to illustrate and clarify the instant invention with respect to the prior art for the benefit of those persons having ordinary skill in the art, thereby enabling them to practice this invention without undue experimentation. The following examples are illustrative only and are not to be considered as limiting the scope of the present invention.

Aspects of applicant's invention and the following examples are more easily understood by reference to a description of the apparatus utilized to measure the flow of sealants when they are applied to a vertical surface. The flow test is conducted with a flow test jig. The flow test jig is stabilized at a temperature of 74 F, varying no more than 4 degrees Fahrenheit, and at a relative humidity of 50 percent, varying no more than 5 percent. The flow test jig possesses a recessed cavity to receive the test sealant, an ace, and a plunger among the elements of its construction. An example of the flow test jig is illustrated in the military specification for adhesive sealants, silicone, RTV, one-component, identified by the military specification number MIL-A-46106B, at figure one.

The test jig is equipped with a plunger which is used to displace the sealant sample from the recessed cavity. The recessed cavity is filled with the test sealant from a representative sample container. The adhesive-sealant must not be worked with a spatula but should leveled off even with the block containing the recessed cavity. The military specification stipulates that the manner of leveling the adhesive-sealant sample is done by making two passes with the spatula, each starting at the center and moving towards the sides of the jig. Within 10 seconds of after the adhesive-sealant is leveled the jig is placed on its base and the plunger immediately advanced to the limit of its forward travel. The cylindrical section formed in the test flow jig is allowed to flow under its own weight on a vertical surface. The flow test begins when the plunger is advanced to the limit of its forward travel, and the flow measurement is taken immediately after the expiration of a 3 minute time period or when the flow has ceased. The flow is measured tangently from the lower edge of the plunger surface to the furthest point to which flow has occurred. The measurement taken after the 3 minute interval is considered to be the initial flow of the silicone adhesive-sealant.

The following examples demonstrate at least one embodiment of applicants' invention.

EXAMPLE ONE

Example one illustrates an embodiment of the invention whereby a sealant has been manufactured by reacting the silanol polymer with a cross-linking agent prior to introduction into an extruder.

An extruder was modified such that a silanol polymer methyltriketoximo-silane reaction section preceded the extruder. The reaction section consisted of a static mixer one foot in length followed by a four foot section of ¾" id pipe, another static mixer one foot long, and a one and one half foot long ¾" id pipe. The first section of pipe, the second static mixer, and the second section of pipe were heated, using heating tape, such that the room temperature polymer fed to the reaction section exited the second static mixer at a temperature ranging from about 75 to about 85 C.

The sealant of this example was prepared using the following proportions of ingredients:

| COMPONENT | PARTS BY WEIGHT |
| --- | --- |
| Silanol polymer (~30,000 cps) | 100 parts |
| Methyltriketoximosilane | 5.04 parts |
| Chlorosilane treated fumed silica | 13 parts |
| M-stopped fluid | 13 parts |
| aminopropyltriethoxysilane | 0.63 parts |
| dibutyltin dilaureate | 0.063 parts |

In this example, the methyltriketoximosilane was added to the silanol polymer at the beginning of the reaction system. The silane treated fumed silica is added in the first section of the extruder. About two-thirds to three quarters of the M-stopped fluid is added at the middle of the extruder. A solution containing the remainder of the M-stopped fluid, the aminopropyltriethoxysilane, and dibutyltin dilaureate was added towards the end of the extruder. The sealant made in this manner had a application rate of 307 g/min. when extruded through a ⅛" nozzle at 90 psi. The flow when measured per the stipulations of the military specification quoted and previously cited was 0.15 inches.

EXAMPLE TWO

This example describes a sealant of essentially the same composition as that listed in Example One, but where the methyltriketoximosilane is added at the initial section of the extruder, in contrast to the mode of addition in the previous example where it was added at the beginning of the reaction system.

A sealant was prepared that had the following proportions of ingredients:

| COMPONENT | PARTS BY WEIGHT |
| --- | --- |
| Silanol polymer (~30,000 cps) | 100 parts |
| Methyltriketoximosilane | 5.04 parts |
| Chlorosilane treated fumed silica | 13 parts |
| M-stopped fluid | 13 parts |
| aminopropyltriethoxysilane | 0.63 parts |
| dibutyltin dilaureate | 0.063 parts |

The addition points of all the reactants were identical to those used in Example One with the exception of the methyltriketoximosilane which was added at the initial stages of the extruder in contrast to being added at the initial stage of the static mixer. The sealant thus prepared had an application rate of 296 g/min. and a flow of 2.6 inches.

EXAMPLE THREE

In this example the cross linking agent, methyltriketoximosilane, was added at the end of the extruder concurrently with the aminopropyltriethoxysilane and the dibutyltin dilaurate.

| COMPONENT | PARTS BY WEIGHT |
| --- | --- |
| Silanol polymer (~30,000 cps) | 100 parts |
| Methyltriketoximosilane | 5.04 parts |
| Chlorosilane treated fumed silica | 13 parts |
| M-stopped fluid | 13 parts |
| aminopropyltriethoxysilane | 0.63 parts |
| dibutyltin dilaureate | 0.063 parts |

The addition points were the same as in example one with the exception that the methyltriketoximosilane was added toward the end of the extruder and all the M-stopped fluid was added approximately in the middle of the extruder. The sealant prepared by this variation of experimental conditions exhibited an application rate of 152 g/min. and a flow of 0.25 inches.

EXAMPLE FOUR

This example, an embodiment of the instant invention, repeats the conditions of example one with the exception of using a higher level of dibutyltin dilaurate.

| COMPONENT | PARTS BY WEIGHT |
| --- | --- |
| Silanol polymer (~30,000 cps) | 100 parts |
| Methyltriketoximosilane | 5.04 parts |
| Chlorosilane treated fumed silica | 13 parts |
| M-stopped fluid | 13 parts |
| aminopropyltriethoxysilane | 0.63 parts |
| dibutyltin dilaureate | 0.252 parts |

As was done in example one, the methyltriketoximosilane was added to the beginning of the reaction section, all other inputs were added at the same locations as described in example one. This sealant had an application rate of 311 g/min. and a flow of 0.15 inches.

The foregoing examples demonstrate both a reduction to practice of the instant invention and an operable embodiment of the instant invention, specifically the decreased gravity induced vertical flow or sag obtained with ketoxime sealants when the ketoxime and polymer are introduced into a reaction section preceding the extruder. More generally, the introduction of a cross-linking agent and a silicone polymer into a reaction section preceding the extruder produces a ketoxime silicone containing sealant that exhibits low vertical flow or sag.

Having described the invention, that which is claimed is:

1. A method for producing a room-temperature vulcanizable composition having a high thixotropy and a high rate of extrusion from an extruder having a front end and an exit end with a middle in between, said extruder preceded by a static mixer having an entry and an exit to a first injection port of said extruder, said extruder having a second injection port after the first injection port, a third injection port at the middle of said extruder and a fourth injection port between the middle of the extruder wherein is located the third injection port and the exit port, said method comprising the steps in order of:

(1) continuously supplying a base composition (A) to a static reactor which feeds the base composition from an exit port of the static mixer to an extruder at a first supply port of the extruder, said base composition (A) comprising 100 parts by weight of a diorganopolysiloxane polymer, (A1), said diorganopolysiloxane polymer having the formula $HO(R_2SiO)_xH$ where each R is a monovalent hydrocarbon radical free of aliphatic unsaturation and containing from 1 to about 10 carbon atoms, and x varies so that (A1) has a viscosity ranging from about 600 to about 300,000 cps at 25° C.; and at least one cross-linking agent, (A4), selected from the group consisting of alkyl-tris(dialkylketoximo)silane, alkyl-tris(dialkenylketoximo)silane, alkyl-tris(alkylalkenyl-ketoximo)silane, alkenyl-tris(dialkylketoximo)silane, alkenyl-tris(dialkenyl-ketoximo)silane, and alkenyl-tris(alkylalkenyl-ketoximo)siliane; being reacted at a temperature ranging from about 20° C. to about 120° C. for a period of time ranging from about 2 minutes to about 60 minutes wherein said diorganopolysiloxane polymer, (A1) and said crosslinking agent, (A4) are added to said static mixer first; and (2) continuously adding at a second injection port, (A2) an amount of from about 3 to about 25 parts by weight based upon (A1) of a silica filler having a surface area of from about 100 to about 300 m²/g as measured when said silica filler is in an untreated state; and (A3) up to about 200 parts by weight based upon (A1) of finely divided calcium carbonate; and (3) continuously adding at a third injection port (B1), an M-stopped fluid, an amount of up to about 56 parts by weight based upon (A1), having a viscosity ranging from about 50 to about 10,000 cps at 25° C.; and (4) continuously adding at a fourth injection port (B1) an amount of up to about 24 parts by weight based upon (A1), having a viscosity ranging from about 50 to about 10,000 cps at 25° C., and (B2) a tin based catalyst present in an amount of up to 0.50 parts by weight based upon 100 parts of the base composition (A) and optionally (A5) gamma-aminopropyltriethoxysilane present in an amount up to about 4 parts by weight based upon 100 parts of the base composition (A); wherein the cross linking agent, (A4), ranges from about 2 to 15 parts by weight based upon the sum of (A1),(A2), and (A3) and (5) extruding the resultant composition from the extruder such that said room temperature vulcanizable sealant composition having high application and low sag exits the exit port of the extruder.

2. The process of claim 1 wherein the cross-linking agent is selected from the group consisting of methyl-tris(methylethylketoximo)silane and vinyltris(methylethylketoximo)silane.

3. The process of claim 1 wherein (A1) has a viscosity of from about 2,000 to about 200,000 cps at 25° C.

4. The process of claim 3 wherein (A1) has a viscosity of from about 3,000 to about 150,000 cps at 25° C.

5. The process of claim 1 wherein the silica filler (A2) has an average surface area of about 200 m²/g in an untreated state.

6. The process of claim 1 wherein the silica filler, (A2), is treated with hexamethyldisilazane prior to its addition at said second injection port.

7. The process of claim 1 wherein (B1) has a viscosity of from about 50 to about 3,000 cps at 25° C.

8. The process of claim 7 wherein (B1) has a viscosity of from about 50 to about 1,000 cps at 25° C.

9. The process of claim 1 wherein (B2) is present in an amount of from about 0.05 to about 0.4 parts by weight of the base composition (A).

10. The process of claim 9 wherein (B2) is present in an amount of from about 0.1 to about 0.3 parts by weight of the base composition (A).

11. The process of claim 10 wherein (B2) comprises dibutyl tin dilaurate.

12. The process of claim 1 wherein the silica filler (A2) has an average surface area of about 130 m²/g in an untreated state.

13. The process of claim 1 wherein the silica filler,(A2), is treated with chlorosilane prior to its addition at said second injection port.

14. The process of claim 1 wherein the silica filler,(A2), is treated with octamethylcyclotetrasiloxane prior to its addition at said second injection port.

* * * * *